United States Patent
Mann et al.

(10) Patent No.: US 7,024,633 B1
(45) Date of Patent: Apr. 4, 2006

(54) METHODS AND APPARATUS FOR CREATING AND TRANSFORMING GRAPHICAL CONSTRUCTS

(75) Inventors: Ronald J. Mann, Concord, MA (US); David Dice, Foxborough, MA (US); David B. Therkelsen, Andover, MA (US)

(73) Assignee: SUN Microsystems, Inc., Palo Alto, CA (US)

( * ) Notice: Subject to any disclaimer, the term of this patent is extended or adjusted under 35 U.S.C. 154(b) by 560 days.

(21) Appl. No.: 09/855,968

(22) Filed: May 15, 2001

Related U.S. Application Data

(60) Provisional application No. 60/276,664, filed on Mar. 16, 2001.

(51) Int. Cl.
*G06F 3/00* (2006.01)
*G06F 9/00* (2006.01)
*G06F 17/00* (2006.01)

(52) U.S. Cl. ............. 715/765; 715/764; 715/744; 715/747

(58) Field of Classification Search ............. 345/618, 345/764, 763, 765; 715/765, 764, 744, 747
See application file for complete search history.

(56) References Cited

U.S. PATENT DOCUMENTS

| | | | | |
|---|---|---|---|---|
| 5,555,370 A | * | 9/1996 | Li et al. | 345/763 |
| 6,677,962 B1 | * | 1/2004 | Bailey | 345/744 |
| 2001/0020956 A1 | * | 9/2001 | Moir | 345/765 |

* cited by examiner

*Primary Examiner*—John Cabeca
*Assistant Examiner*—Namitha Pillai
(74) *Attorney, Agent, or Firm*—Chapin IP Law, LLC; Barry W. Chapin, Esq.

(57) ABSTRACT

Mechanisms and techniques provide a system for composing a complex constructs for use on a graphical display of a computerized device. The system receives a selection of basic constructor objects for use in the complex object. The basic constructor objects are chosen from a set of basic constructor object types including a button object type, a dial object type, an edit object type, and a container object type. The systems also receives a selection of one or more personalities to assign to the basic constructor objects. The personalities define extensions to basic constructor object operation and define a view for the object when rendered on an interface. The system combines the personalities and the basic constructor objects to define complex constructs such as menus, a scrollbars and the like. Personalities can be modified to alter the complex construct from one operational state to another.

29 Claims, 7 Drawing Sheets

METHODS AND APPARATUS FOR CREATING AND TRANSFORMING GRAPHICAL CONSTRUCTS

CLAIM TO BENEFIT OF EARLIER FILED PROVISIONAL PATENT APPLICATION AND INCORPORATION BY REFERENCE

The present invention claims the benefit of the filing date of an earlier filed, U.S. Provisional Patent Application having Ser. No. 60/276,664, entitled "METHODOLOGY FOR BUILDING A SCALABLE GRAPHICAL USER INTERFACE", filed Mar. 16, 2001 now abandoned, and which is assigned to the assignee of the present invention. The complete teachings and contents of this Provisional Patent Application are hereby incorporated by reference in their entirety.

FIELD OF THE INVENTION

The present invention generally relates to systems for the creation of graphical user interfaces, and more particularly, to systems and techniques which provide a development environment for the creation graphical objects used in graphical user interfaces.

BACKGROUND OF THE INVENTION

Many modern computerized devices include an implementation of software and/or hardware that operates to provide a graphical user interface (GUI) that allows a human user to interact with and use the functionality of such computerized devices. By way of example, the majority of personal computers and workstations in use today are controlled via a graphical windowing interface or similar environment that is typically part of the operating system the execute to control these computer systems. As another example, a handheld computing device such as a palm-top personal digital assistant (PDA) provide a fairly simple windowing interface providing a user touch pad access to functions of the device. In both cases, the windowing interface provides a fairly consistent set of features and windowed views that allows a user to operate different software applications in a consistent manner.

As a specific example of this consistency, most graphical user interfaces provide the ability for a user to operate a software application within a window that the operating system displays on an output device, such as an LCD display or screen that is part of the computer system, when the user invokes the software application. The window typically provides four sides that may be resizable to allow a user of the software application to alter the screen size of the window. The window may also include such features as horizontal and vertical scrollbars allowing the user of the software application to scroll information (e.g., the contents of the software application) up and down or left and right within the window. The window may also provide one or more pull-down menus that the user may select with an input device such as a mouse, which causes the menu to expose a number of menu choices for selection by the user. The window may further include a title bar that displays a heading or a title for the software application or operating system function that is performing within the window. The title bar might be a standardized feature in all window constructs and might include one or more operable buttons or icons that allow a user to minimize or maximize the view of the window and its entire contents. Other standard window features may exist as well.

Generally, the features or "constructs" that make up a window appear the same or quite similar for each different software application that operates on the computer system. Differences from one window to another might include the addition or removal of certain constructs which may or may not be needed in a particular window. For example, if a user sizes a window appropriately, there may be no need to display a horizontal scrollbar construct in the window since the user can completely view the contents of the window in the horizontal direction. As another example, some windows might include different pull-down menu constructs as opposed to others, depending upon the functionality that a software application provides within the window. Generally however, the same constructs associated with one window, such as scroll bars, pull down menus, resizable window edges, title bars, and the like operate and appear the same in other windows. This is because developers of software applications use a common set of prepackaged or "canned" constructs that completely encapsulate the functionality of, for example, a horizontal scroll bar. Graphical user interface developers thus purposefully intend for the operation of window constructs to be the same from one application to another in order to provide a consistent "look and feel" for operation of the graphical user interface.

Graphical user interface system developers have supplied software application developers with graphical user interface "toolkits" for use in the creation of windowed software applications. Such toolkits provide a standard set or palette of constructs, sometimes called a "widget library." A widget library is basically a set of predefined objects containing construct definitions from which a graphical user interface designer can select for use in the creation and implementation of graphical user interface-based software applications. For example, a toolkit might provide menu and scrollbar widget libraries for selecting different types of menu constructs (pull-down, cascading, etc.) and scrollbar constructs (horizontal and vertical) for use in an application. A software developer can incorporate widget objects into the software application under development in order to provide the graphical user interface operations for the application.

A single widget object for a particular window construct, such as a scrollbar widget object, defines the complete "look and feel" or view of the scrollbar construct during operation and also defines all aspects of the operation and event handling characteristics for the scrollbar. In other words, a scrollbar widget defines the complete context for how an application renders and operates a scrollbar construct based on the scrollbar widget. A single scrollbar widget encapsulates all functionality related to scrollbar event interception, delivery and processing functionality, as well as scrollbar layout and view management functionality which the scrollbar construct provides during user operation of the scrollbar in the application in which the scroll bar is incorporated. Other widgets for different constructs encapsulate all of this information as well for those constructs.

Examples of commercially available graphical user interface development platforms (e.g., toolkits) which provide various types of widget libraries include the "Abstract Windowing Toolkit" (AWT), "Javabeans", "Swing", and others. A brief discussion of these toolkits and their associated features can be found in the provisional patent application from which the present application claims the benefit of the filing date and which is incorporated by reference above. Generally, graphical user interface-based software applications which software developers create with such toolkits are intended to conform to a Write Once Run Anywhere (WORA) paradigm which attempts to allow the applications to appear and operate consistently from one computing platform (e.g., a personal computer or workstation) to another (e.g., a handheld computing device).

Aside from toolkits, other window-based software application development environments provide other techniques in which a window can be enabled with constructs such as scrollbars, menus, and the like. For example, in an operating system such one of the Microsoft Windows series of operating systems (Windows 95, 98, 2000, NT and CE, which are each trademarks of Microsoft Corporation), manufactured by Microsoft Corporation of Redmond, Wash., USA, a software application can provide a window with a scrollbar by invoking an operating system function call to create a window with a scrollbar parameter or flag set to true. The scroll bar parameter causes the window to be rendered with the appropriate scroll bar. The create window system call can include other parameters that may be set or unset to specify what other standard constructs can be included in the window as well. For example, parameters can be provided to include a title bar, various menus, and the like.

SUMMARY OF THE INVENTION

Conventional solutions for the development of graphical user interfaces and the windowing constructs used therein suffer from a variety of deficiencies. In particular, conventional graphical user interface development systems attempt to provide a complete set of services in the form of widget libraries for the creation of graphical user interfaces for operation on various types of computing platforms. However, many computing platforms have inherent physical limitations or differences such as limited memory sizes or screen (i.e., display) real estate that make the use of conventional widget libraries cumbersome and efficient on all types of computing platforms.

As an example, consider the processing and display resource differences between a personal computer or workstation computing platform versus a handheld computing device such as a personal digital assistant (PDA). A software application developed, for example, in Java for a desktop or stationary computing platform such as a workstation may include pre-packaged constructs selected from a Java development toolkit. The Java application constructs will attempt to operate the same on both the desktop and the handheld computing devices, regardless of the changes in processing, display or memory requirements that differ between such computing platforms. As a specific example, a horizontal scrollbar will appear as a horizontal scrollbar no matter which computing platform that construct is operated upon. This can be problematic in a computing platform such as a handheld computing device (e.g., a PDA or cell phone) in which the LCD display size is minimal and the screen real estate occupied by a horizontal scrollbar may be more appropriate for displaying other aspects of the application.

A conventional approach to solving this type of problem is to create a new widget for a new type of construct in the widget library. The new widget can define all of the properties, operational requirements, event handling characteristics, layout management and the "look and feel" aspects for the new displayable interface construct which can serve a function or need that is similar to the horizontal scroll bar, but by taking up less screen real estate. However, creation of new constructs from scratch is an involved process that requires intricate programming skills. Also, by creating such new constructs, the windowing toolkits and development environments including the widget libraries become quite large themselves. Furthermore, as more and more constructs are embedded into a software application, that application grows in size.

Moreover, conventional toolkits that provide prepackaged windowing constructs also suffer in that applications that incorporate such constructs rely heavily on native windowing support offered by the computing platforms on which they will operate. For instance, due to the complexity of operation of individual constructs such as menus, scrollbars, and other constructs, these types of conventional constructs depend heavily on the ability of the computing platform or operating system to provide certain event handling features and image or window rendering capabilities. Since such conventional constructs encapsulate all of the functionality and layout management techniques required for that construct's complete operation, certain of these constructs may utilize very complex event management and layout facilities that are tightly tied to operating system support for a given computing platform. The result is that the conventional "bulky" construct is often limited to being incorporated into applications designed for specific computing platforms, but that will not function properly on others having limited underlying native support for the required features. As a result of this problem, the Write Once Run Anywhere paradigm is eroded and the construct is no longer reusable on all computing platforms. As such, if the same application is to be ported to a computing platform that does not have the underlying required native support, then an entirely new construct must be developed.

In contrast, the present invention can significantly overcome deficiencies and problems that can arise in the use of pre-package constructs found in conventional interface definition environments (e.g., toolkits). In particular, embodiments of the present invention provide an architecture for the creation of complex windowing constructs using combinations of four fundamental types of basic constructor objects to which different defined personalities may be applied depending upon the circumstances in which the complex construct is to operate. Each type of basic constructor object defines a specific fundamental or basic operation that is generally common to many types of windowing constructs. The four basic constructor object types provided according to embodiments of the invention from which combinations of basic constructor objects may be instantiated to form complex constructs include a button object type, a file object type, an edit object type and a container object type. Embodiments of the invention are based in part on the observation, which will be explained in more detail, that most functional windowing construct operations can be broken down into a combination of one or more of these four fundamental or basic operations: button operations, edit operations, dial operations and container operations.

As such, in embodiments of the invention, a button object provides specific button functionality related to notification of a change to a selection state maintained by the button object upon receiving input. A dial object provides dial functionality that includes a selection of a value from a range of possible values. An edit object provides specific functionality to a complex construct to receive data for editing, to store data, and to provide access to the data within the complex construct. A container object, when included in a complex construct, provides parenting functionality, layout management functionality and event interception functionality for the complex construct. By providing these basic constructor types for use in developing complex constructs such as, for example, scroll bars, menus and the like, the invention separates basic operations from the more complicated interrelationships and visual representations of these basic operations.

To provide the more complicated interrelationships and visual representation of these basic functional elements, embodiments of the invention allow assignment of one or more personalities to the basic constructor objects which make up the complex construct. Personalities are essentially objects (e.g., based on personality classes) that contain extensions to basic constructor characteristics associated with the basic constructor objects. In other words, a basic constructor object defines a set of respective fundamental or basic constructor characteristics including a simple event handling framework dedicated to supplying methods and event handling processing associated with that type of basic constructor object. A specific personality applied to such a basic constructor object extends this basic operation by providing a visual representation and additional functional operations, such as more complex event handling, to allow the basic constructor object to be "molded" into use for a particular circumstance.

By way of example, the basic constructor characteristics of a button object define basic event handling functionality to respond to specific user input by rendering itself either armed or unarmed and to generate very specific and limited events when the state of the button object changes. A personality applied to this button object can define the specific "look and feel" of the button, such as making the button look like a switch, and can further extend the event capabilities of the button object, to supply, as an example only, events indicating how long (e.g., how many seconds) a button (e.g., the switch) has been armed. Another personality might supply a completely different look and feel to the same button object. Embodiments of the invention can allow for the modification of personalities applied to basic constructor objects to augment or morph a complex construct from one state to another depending upon different operational requirements or environments.

In particular, the system of the invention provides method embodiments which include a method for composing a complex construct for use on a graphical display of a computerized device. This method embodiment comprises the steps of receiving a selection of basic constructor objects for use in the complex object. The selection of basic constructor objects is chosen from a set of basic constructor object types including a button object type, a dial object type, an edit object type, and a container object type, and each of the basic constructor object types defines respective basic constructor characteristics. The method also receives a selection of at least one personality to assign to at least one of the basic constructor objects chosen from the selection of basic constructor object types. The selection of at least one personality is chosen from a set of personality types that define extensions to basic constructor characteristics associated with basic constructor object types. The method also combines the selection of basic constructor objects with the selection of at least one personality to form a first complex construct and operates the first complex construct on the graphical display according to a first operation state defined by the basic constructor characteristics associated with the basic constructor objects in the first complex construct and by the personalities assigned to the basic constructor objects in the complex construct which define extensions to the basic constructor characteristics.

Another embodiment of the invention includes the steps of receiving a modification to the selection of a personality assigned to at least one of the basic constructor objects in the first complex construct and in response to receiving the modification, transforming the first complex construct having the first operational state to a second complex construct having a second operational state. This embodiment thus allows a complex construct to be transformed by the application of different personalities.

Another embodiment operates the first complex construct to receive input indicating that the first complex object is to transform itself into a second complex construct by substituting a view, defined by the at least one personality assigned to one of the basic constructor objects in the first complex construct, with a new view defined by the modification received to the selection of one of the at least one personality. In this manner, different personalities produce different views of the same basic constructor objects. This allows for the creation of new complex constructs without have to create new widgets from scratch.

In another embodiment, the step of receiving a selection of at least one personality includes the steps of receiving a selection of specific event handling functionality that is to be enabled for that personality in relation to a basic constructor object to which that personality is assigned. The method also receives a selection of specific views which that personality provides to that basic constructor object when rendered on the graphical display of the computerized device. Thus the user can modify a personality by choosing different personality views and the objects to which that personality are assigned are modified accordingly in the complex construct.

In one embodiment, each basic constructor object is an instantiation of a basic constructor class that defines the basic constructor characteristics which provide specific functionality including an event handling framework dedicated to supplying methods and event handling processing associated with that basic constructor class. Thus each basic constructor object only needs to define the fundamental operations common to all different forms of the same basic constructor object types, such as the functions common to all button, edits, dials and containers.

In another embodiment, each basic constructor object has an associated set of applicable personalities, and each applicable personality defines an extended set of event listeners that are specific to the basic constructor objects to which those personalities are applicable. These personalities also extend the event management functionality provided by the basic constructor characteristics of the basic constructor type from which that basic constructor object is instantiated.

In another embodiment, each applicable personality for a basic constructor object further defines a stock view for the basic constructor object when rendered on the graphical display of the computerized device. The stock view thus defines how that personality will make an object to which it is applied appear on a display of a computerized device.

In one embodiment, the complex construct is a scroll bar including two basic button constructor objects combine with respective scroll bar button personalities, a basic dial constructor object combine with a respective scroll bar dial personality, and a basic container constructor object combine with a respective scroll bar container personality.

According to a different method embodiment, a method is provided for transforming complex constructs for use in a graphical interface environment. This method embodiment comprises the steps of defining a first complex construct to include at least one of a basic dial constructor object, a basic edit constructor object, a basic button constructor object, and/or a basic container constructor object, in combination with at least one personality. The method then receives a modification to the at least one personality and transforms the first complex construct to a second complex construct according to the modification to the personality.

In a variation of this embodiment, the step of receiving a modification receives the modification in real time from an application that includes the first complex construct such that the first complex construct is transformed by the step of transforming in real-time to produce the second complex construct. This allows complex construct transforms to take place when application, for example, are transferred form one computer system to another, such as by being downloaded or otherwise transferred.

Other embodiments of the invention include a computerized device, such as a computer system, workstation, handheld or laptop computer, software development workstation or other computer device configured to process all of the aforementioned method operations disclosed herein as embodiments of the invention. In such embodiments, the computer system includes a display, an interface (one or more), a memory system, a processor and an interconnection mechanism connecting the display, the interface(s), the processor and the memory system. In such embodiments, the memory system is encoded with a constructor application that when performed on the processor, produces a constructor process that causes the computer system to perform all of the method embodiments and operations explained herein as embodiments of the invention. In other words, a computer that is programmed to operate as explained herein is considered an embodiment of the invention.

Other arrangements of embodiments of the invention that are disclosed herein include software programs to perform the method embodiment steps and operations summarized above and disclosed in detail below. More particularly, a computer program product is disclosed which has a computer-readable medium including computer program logic encoded thereon that, when executed on at least one processor with a computing system, causes the processor to perform the operations (e.g., the methods) indicated herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone. Example embodiments of the invention may be implemented within computer systems, computer program products and software applications manufactured by Sun Microsystems of Mountain View, Calif., USA.

BRIEF DESCRIPTION OF THE DRAWINGS

The foregoing and other objects, features and advantages of the invention will be apparent from the following more particular description of preferred embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
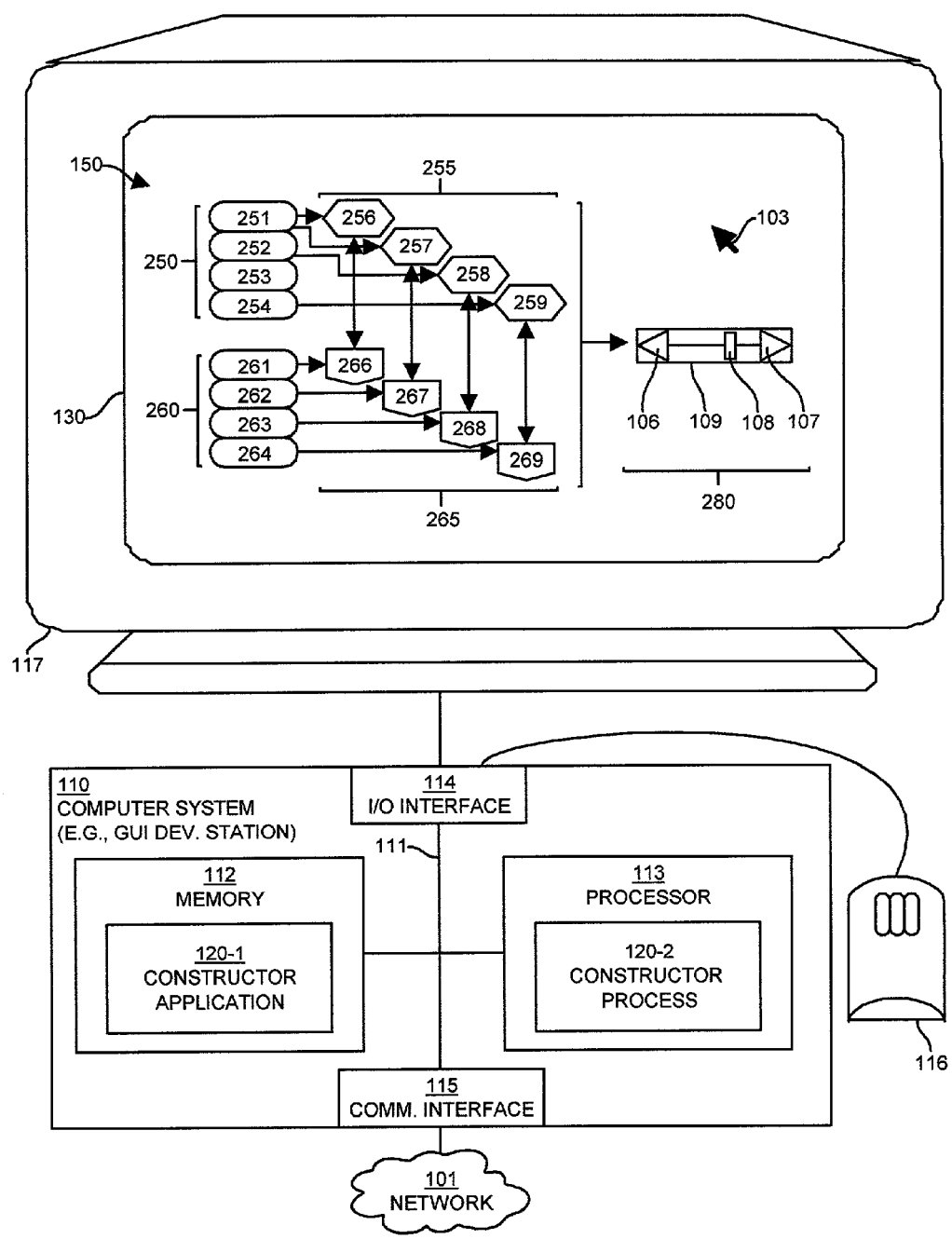
FIG. 1 illustrates an example computing system environment including a constructor application and constructor process configured in accordance with embodiments of the invention.

Embodiments of the invention provide mechanisms and techniques for composing complex constructs, such as windowing constructs used in a graphical user interface environment, from a combination of instantiations of four base classes of objects, called basic constructor objects, and from personalities assigned to those basic constructor objects. Each different type of basic constructor object defines a respective basic fundamental operation that can occurs within a complex construct. The four basic constructor object types operate as building blocks for complex constructs and include a button object type, a file object type, an edit object type and a container object type. By combining instantiations of these basic constructor object types and by selecting and assigning personalities to the basic constructor objects, complex constructs can be formed of an almost limitless variety. As an example that will be explained in more detail, a scroll bar construct may be created with a container object, two button objects and a dial object and an assignment of a scroll bar personality (e.g., horizontal scroll bar) to each of these objects.

In addition, embodiments of the invention allow a first complex construct, such as scroll bar complex construct, to be transformed into a second (i.e., another) complex construct, such as a knob selector, by allowing modification(s) to be made to the personality(s) assigned to one of more of the basic constructor objects that make up the first complex object. This allows a second complex construct to be derived based on a first complex construct without the requirement to develop a new widget or class for the second complex construct. By transforming or morphing complex constructs from one set of personalities to another, the complex constructs can adapt themselves to their operational environments on an as needed basis.

In embodiments of the invention, a button object provides specific functionality related to notification of a change to a selection state maintained by the button object upon receiving input, for example, from a user. A dial object provides specific functionality related to selection of a value from a range of possible values. An edit object provides specific functionality related to a complex construct to i) receive data for editing, ii) to store data, and iii) to provide access to data within the complex construct. A container object, when included in a complex construct, provides one or more functionalities such as i) parenting functionality, ii) layout management functionality and iii) event interception functionality for the complex construct. Using these basic functional breakdowns in combination with each other, embodiments of the invention can create complex constructs that collectively provide the operational capabilities of the general functions provided by conventional pre-packaged constructs such as scroll bars, menus, and the like. However, unlike conventional constructs, complex constructs created according to embodiments of the invention can be transformed, via personality modification(s), into new complex constructs which are beneficial in a variety of circumstances.

FIG. 1 illustrates an example architecture of the computer system 110 such as a software or graphical user interface development station configured according to an example embodiment of the invention. The computer system 110 may be any type of computerized device such as a personal computer, workstation, portable computing device (e.g., laptop or handheld computer) or the like. The computer system 110 includes an interconnection mechanism 111 (e.g., a bus and/or circuitry) which couples a memory system 112 (e.g., random access memory (RAM) and/or read only memory (ROM)), a processor 113 (e.g., a microprocessor or central processing unit), an input/output interface 114 (e.g., device port(s)) and a communications interface 115 (e.g., modem or network interface). The input/output interface 114 allows peripheral devices to be connected to the computer system 110. In this example, coupled to the input output interface 114 and operating as part of the computer system 110, are a peripheral input device 116 such as a mouse or keyboard and a peripheral output device 117 such as a computer monitor or screen which includes a display 130 upon which the computer system 110 can render or otherwise display visual images such as a graphical user interface 150 for viewing by a user (not shown). The communications interface 115 allows the computer system 110 to communicate with other computer systems (not shown) that operate within the network 101.

The memory system 112 is encoded with a constructor application 120-1. The constructor application 120-1 is software code, data, data structures, classes, and/or logic instructions that embody the processing functionality and software embodiments of the invention. The processor 113 can access the memory system 112 via the interconnection mechanism 111 in order to launch, run, execute, interpret or otherwise perform the logic instructions of the constructor application 120-1 in order to produce the constructor process 120-2. In other words, the constructor process 120-2 represents one or more portions of the constructor application 120-1 (or the entire application 120-1) performing within or upon the processor 113 in the computer system 110.

It is to be understood that embodiments of the invention include the constructor application 120-1 (i.e., the un-executed or non-performing logic instructions and/or data) encoded within a computer readable medium such as a floppy disk, hard disk or in an optical medium (such disk mediums not shown), or in firmware or, in this example, as executable code within the memory system 112 (e.g., within RAM). It is also to be understood that other embodiments of the invention comprise the constructor application 120-1 operating within the processor 113 as the constructor process 120-2. While not shown in this example, those skilled in the art will understand that the computer system 110 may include other processes and/or components, such as an operating system and a software application under development (into which a complex construct of this invention is to be incorporated), which have been left out of this illustration for ease of description of the invention.

Directing attention now to the graphical user interface 150, generally, a user can use the input device 116 to control an input selector 103 such as a mouse pointer to direct the constructor process 120-2 to provide the graphical user interface 150. This allows the user to create one or more complex constructs 280 (only one shown in this example) for use in an interface (not specifically the graphical user interface 150) of a software application (not specifically shown) under development by the user. To do so, the constructor process 120-2 allows the user to select a from a variety (four in preferred embodiments of the invention) of basic constructor object types 250 (251 through 254) to instantiate a set of basic constructor objects 255 (256 through 259). In addition, a user can select one or more personalities 265 (266 through 269) from a set of available personality types 260 (261 through 264) and can associate (shown by the vertical arrows) the set of selected personalities 265 to one or more of the set of selected basic constructor objects 255. The constructor process 120-2 can then combine the selected basic constructor objects 255 with the selected personalities 265 to create the complex construct 280, which is a scroll bar in this example.

Specifically, in this simple example, the constructor process 120-2 creates the left arrow 106 of the scrollbar 280 from the combination of the personality 266, which may be a button personality that describes a layout (e.g., view on the display 130) and event functionality (e.g., operation) for a left arrow as used within a horizontal scrollbar, as applied to the basic constructor object 256, which may be a button object in this example providing basic fundamental button functionality. In a similar manner, the constructor process 120-2 creates the right arrow 107 of the scrollbar 280 from the combination of the personality 267, which may be another button personality that describes a general layout and event functionality for a right arrow used in a horizontal scrollbar, as applied to the basic constructor object 257, which may be a button object in this example. In addition, the constructor process 120-2 creates the slider 108 in the scrollbar 280 from the combination of the personality 268, which may be a dial personality that describes general layout and event functionality for a horizontal scrollbar slider, as applied to the basic constructor object 258, which may be a dial object in this example. Finally, the constructor process 120-2 creates the surrounding perimeter 109 of the scrollbar 280 from the combination of the personality 269, which may be a container personality that describes a general layout and event functionality for the horizontal scroll bar perimeter and the interrelationships between child objects that are related to a horizontal scrollbar, as applied to the basic constructor object 259, which may be a container object in this example that serves as the parent object to the buttons 256, 257 and the slider 258. In other words, the container object 259 may be inherit, as child classes, the button objects 106 and 107 and the dial object 108. In this manner, the constructor process 120-2 ties together the relationships between the basic constructor objects 252 and their applicable personalities 254 to create the complex horizontal scrollbar construct 280. More specific details of the operation of embodiments of invention will be provided next with respect to the processing operations in FIG. 2.

Figure 2:
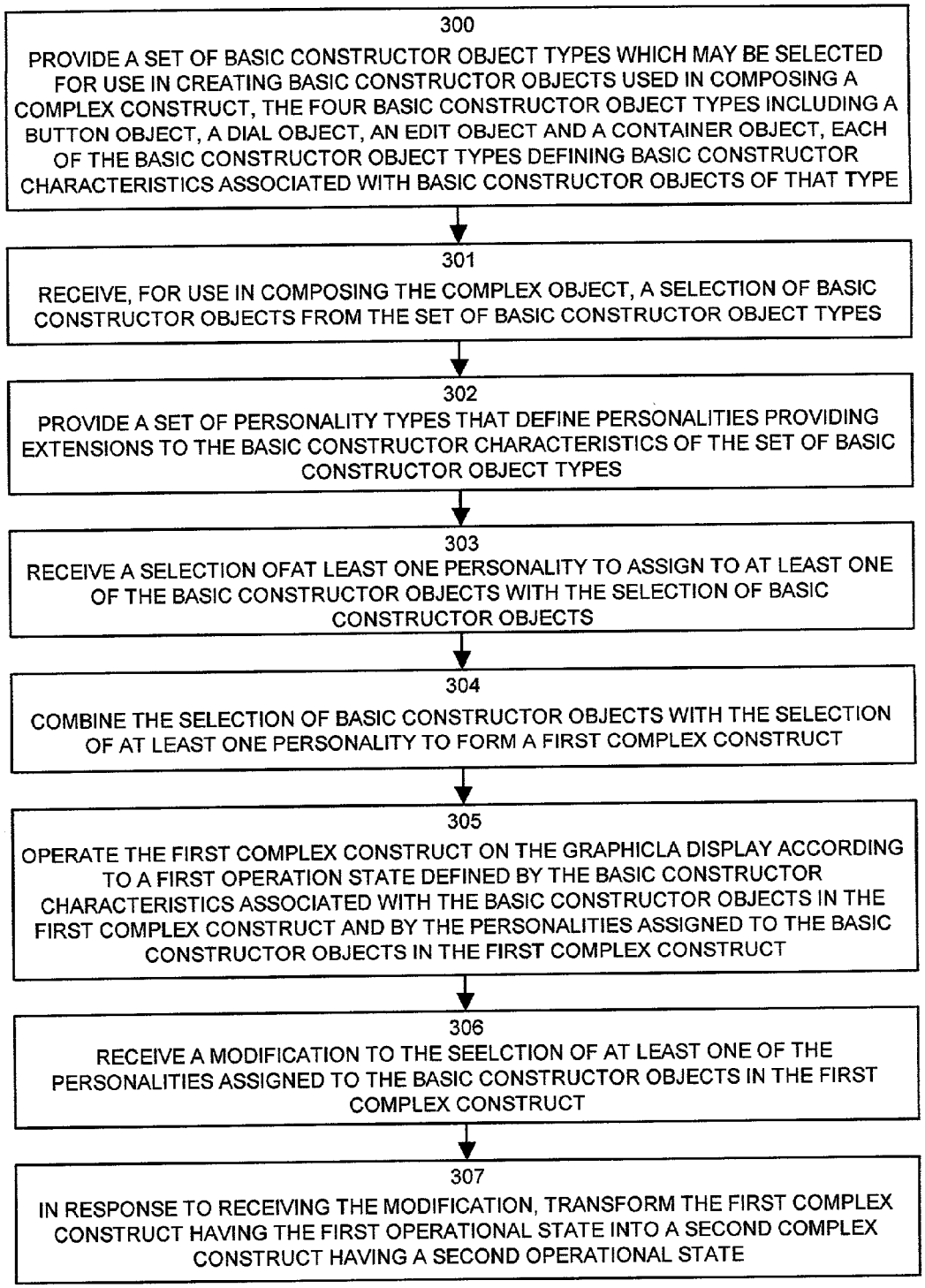
FIG. 2 is a flow chart of processing steps performed by a constructor application and process configured according to embodiments of the invention.

FIG. 2 shows the processing steps as performed according to a constructor process 122 configured according to one embodiment of the invention to develop complex constructs 280 such as the scrollbar in FIG. 1. Complex objects 280 developed according to this process may be used for interface development in windowing or other graphical computing or device environments.

In step 300, the constructor process 122 provides a set of basic constructor object types 250 which may be selected (e.g., by a user or by an automated process such as a protocol, as will be explained later) for use in creating (e.g., instantiating) basic constructor objects 255 used in composing a complex construct 280. In preferred embodiments of the invention, there are four basic constructor object types 251 through 254 through, such as classes (e.g. Java classes), from which the constructor process 120-2 can instantiate four different types of basic constructor objects. The four basic constructor object types 251 through 254 included in embodiments of the invention include a button object 251, a dial object 252, an edit object 253 and a container object 254.

Each of the basic constructor object types 251 through 254 (i.e., each class) defines basic constructor characteristics associated with (i.e., that are incorporated into or inherited by) the respective basic constructor objects of that type (i.e., instantiated there from). In other words, each basic constructor object 252 is an instantiation of a respective basic constructor class 250 that defines certain basic constructor characteristics for that object. The basic constructor characteristics for a particular basic constructor object 252 provide specific functionality for that object including an event handling framework dedicated to supplying methods and event handling processing associated with that basic constructor class 250. Specific layout functionality is not however included in the basic constructor characteristics for a particular basic constructor object 252.

In the example in FIG. 1, the button object 256 is instantiation of the button object constructor class 251 which contains or defines event handling methods and operational functionality for the generic operation of a button on a graphical user interface. Such functionality might include, for example, functionality to provide notification of a change to a selection state maintained by the button object 256 upon receiving input from an input device such as the mouse 116 (FIG. 1). Generally then, the four basic constructor object types 250 contain definitions of methods and functional operations for the generic basic constructor objects which each type defines. Specifically, the dial object type 252 provides selection functionality to select a value from a range of possible values. The edit object type 253 (which is not instantiated as an object within the example complex construct 280 in FIG. 1) provides functionality to receive data for editing, to store data, and to provide other access to data within a complex construct 280. The container object type 254 provides basic parenting functionality, basic layout management (e.g., for child objects) functionality and event interception functionality for the complex construct 280.

Returning attention now to the flow chart of processing steps in FIG. 2, in step 301, the constructor process 120-2 receives, for use in composing the complex object 280, a selection of basic constructor objects 255 from the set of basic constructor object types 250.

Next, in step 302, the constructor process 122 provides a set of personality types 260 identifying personalities providing extensions to the basic constructor characteristics of the set of basic constructor object types 250. In one embodiment, the personalities 260 are class definitions which provide extensions to the functionality and default layout of basic constructor objects 255 instantiated from the basic constructor object types 250. Certain personalities 260 may be applicable to certain basic constructor object types 250 and not to others. In other words, each basic constructor object 255 has an associated set of applicable personalities 260. Each applicable personality 260 defines an extended set of event listeners that provide specific event functionality for a certain purpose for those basic constructor objects 255 to which that personality is applied. The personalities 260 thus extend the event management functionality provided by the basic constructor characteristics of the basic constructor type 250 from which that basic constructor object 255 is instantiated. The extensions result in an object having a specific layout, operation and functionality, as opposed to the basic constructor characteristics that provide only the fundamental or generic object function with no specific view or layout.

As an example, a button object 256 may have a variety of different personalities 260 that may be applied in order to cause the generically functioning button object 256 to render itself as a specific type of button and to operate in various ways on the display 130 within a graphical user interface of a software application that uses a complex construct 280 containing that button object. One personality applied to a button object 256 may cause the button object to appear as a round button and may cause the button to operate in a first manner (e.g., requiring a click-and-hold operation to activate the button), whereas a different personality will cause the same button object to appear and to operate differently.

As will be explained shortly, personalities 260 can be modified in both real time and non-real time in order to transform or morph the functionality, layout and view of a particular object from a first state to a second state. In this manner, the architecture of embodiments of the invention allows complex constructs 280 to be transformed by simply modifying personalities assigned to basic constructor objects 255 that make up the complex construct 280, without having to define an entire new construct. Thus a subtle change required to a complex construct can be achieved by modifying the personalities related only to the relevant basic constructor objects that require the change. Other personalities of other basic constructor objects in that complex object which do not need to change appearance or operation can remain with the same assignment of their original personality.

Returning attention to the processing steps in FIG. 2, in step 303, the constructor process 120-2 receives a selection of at least one personality 260 to assign to at least one of the basic constructor objects 256 through 259 that exist within the selection of basic constructor objects 255. As noted above, it may be the case that a distinct respective personality 266 through 269 is assigned to each respective basic constructor object 256 through 259 (i.e., one to one). Alternatively, in other embodiments of the invention, a generic personality (not specifically shown) can be applied to the entire selection 255 of basic constructor objects to provide each with a preset look and feel and operation.

Next, in step 304, the constructor process 120-2 combines the selection of basic constructor objects 255 with the selection of at least one personality 265 to form a first complex construct 280. According to one embodiment of the invention then, the processing of steps 300 through 304 operate to allow the creation of complex constructs 280 in which specific personalities 260 are applied to generic fundamental windowing operations defined by each of the four basic constructor object types 250. In this manner, the system of the invention allows for the creation of extremely robust complex constructs 280 that can implement most any kind of window construct or application functionality. Essentially, the architecture of this example embodiment of the invention divides out or separates simple basic functionality (as contained in the basic constructor objects) from visual presentation and complex event handling operations (as contained in the personalities).

The remaining processing steps 305 through 307 in FIG. 2 illustrates additional functionality of other embodiments of the invention.

Specifically, in step 305, the computer system 110 operates the first complex construct 280 on a graphical display 130 of the computer system 110 according to a first operation state defined by the basic constructor characteristics associated with the basic constructor objects 255 in a first complex construct 280 and by the personalities 265 assigned to the basic constructor objects 255 in the first complex construct 280.

Accordingly, the processing steps 305 includes the operation of a complex construct 280, such as, for example, the horizontal scrollbar illustrated in FIG. 1, within a software application (not specifically shown) performing (e.g., executing, running, being interpreted, or otherwise operating) on the computer system 110. That is, the processing steps 300 through 304 operate an embodiment to create the complex construct 280 and processing step 305 represents an embodiment that includes the operation of that complex construct 280 within a user created software application.

It may be the case that many complex constructs 280 are created according to many different iterations of steps 300 through 304, and then, the complex constructs 280 are interrelated to each other in an upper layer of software which serves a graphical user interface within a software application developed by a user of the computer system 110. That is, a typical complex construct 280 created according to the techniques of the invention as previously explained can be used as a sub-part or component within window or other entity that operates in an application created from a graphical user interface development environment. In the example of FIG. 1, the horizontal scrollbar complex component 280 can be incorporated into windowing interfaces that require the use of such a feature.

Steps 306 and 307 represent operation of another embodiment of the invention. In step 306, an entity such as the constructor process 120-2 in the example configuration FIG. 1 receives a modification to the selection of at least one of the personalities 265 assigned to the basic constructor objects 255 in the first complex construct 280.

Next, in step 307, in response to receiving the modification, the entity (the constructor process 120-2 in this example) transforms the first complex construct 280 having a first operational state into a second complex construct (not shown in FIG. 1) having a second operational state. In other words, the embodiment represented by steps 306 and 307 operates to receive a change or modification to the selection of personalities 265 which were previously assigned (in step 303 in the former embodiment) to the selected basic constructor objects 255. In response, in step 307, by changing one or more of the personalities 265 assigned to the objects 255, the constructor process 120-2 (in this example) morphs or transforms the complex construct 280 originally formed by the combination of personalities 265 and objects 255 into another complex construct 280 that might have, for example, a different appearance and/or a different operation. In this manner, operation of this embodiment of the invention allows a user of the constructor process 120-2, or alternatively, a software application itself in which the complex construct 280 is embedded, to make changes to one or more the personalities 265 which results in a new complex construct to be created for use in a new context.

In one embodiment of the invention, the constructor process 120-2 operates steps 306 and 307 in FIG. 2 in order to receive the personality modification(s) (step 306) from a user during development of another (e.g., a second) version of a software application that includes the first complex construct 280. As a result of the modifications to the personalities 265 (e.g., a selection of one or more new personalities, or, receiving modifications to existing selected personalities), the constructor process 120-2 creates a second new complex construct (e.g., 280-2, not shown in FIG. 1) for use by the application and thus provides for a second version of the software application that embodies that second new complex construct.

It might be the case, for example, that the first version of a software application created by a user operates the scrollbar complex construct 280 illustrated in FIG. 1 and is intended for use on computing platforms such as a desktop personal computer or workstation. However, after development of such a software application using the scrollbar complex construct 280, it might further be the case that the developer of the software application is required to port, copy, download or otherwise transfer the same software application to a different computing platform (e.g., to a handheld device such as a cell phone or a personal digital assistant computing device) for operation of the same software application on that new platform. The second computing platform might contain different processing or application execution environment resources than the first computing platform (e.g., a small LCD screen as opposed to a large computer display). As such, the user of the constructor process 120-2 of the invention can alter or select new personalities 265 to modify the scroll bar complex construct 280 into a slightly different type of complex construct that provide the same output to the application (e.g., scrolling through data) but does so using a different layout or view (examples of which will be described later). Perhaps the second scrollbar complex construct takes up less screen real estate than the first scrollbar complex construct 280, or it may be different in other ways as well (both functionally and visually).

As a result of this process, the user of the constructor process 120-2 generates a new version of the software application that generally operates the same (i.e., provides the same general functionality) but that contains the second and more compact scrollbar complex construct 280. When the second version of the software application is performed on the second computing platform (i.e., the handheld device) having less screen real estate, the second scrollbar complex construct operates to produce the same functional output as the first complex construct 280, but does so using less screen real estate.

This simple example illustrates the power of embodiments of the invention to easily modify, transform or morph complex constructs 280 without requiring significant rewriting of software applications and without requiring development from scratch of new complex constructs embodied in widget libraries to serve new requirements or purposes.

According to another alternative configuration of the processing steps 306 and 307, the software application (not shown in this example) that embodies the first complex construct 280 can itself detect that it has been transferred, downloaded or otherwise copied to a second computing platform. In such a scenario, the software application may have access to the selection of different personality types 260 and may chose to invoke functionality to select or otherwise modify new or existing personalities 265 (step 306) in order to dynamically transform (step 307) the scrollbar complex construct 280 into a different form of complex construct for use on the second computing platform. In other words, this alternative embodiment of the invention does not operate the processing steps 306 and 307 within the constructor process 120-2, but rather, provides a plugable personality engine (to be explained) that software applications can use to dynamically modify complex constructs 280 on-the-fly during run time of the software application that embodies or uses the modifiable complex construct(s) 280.

Figure 3:
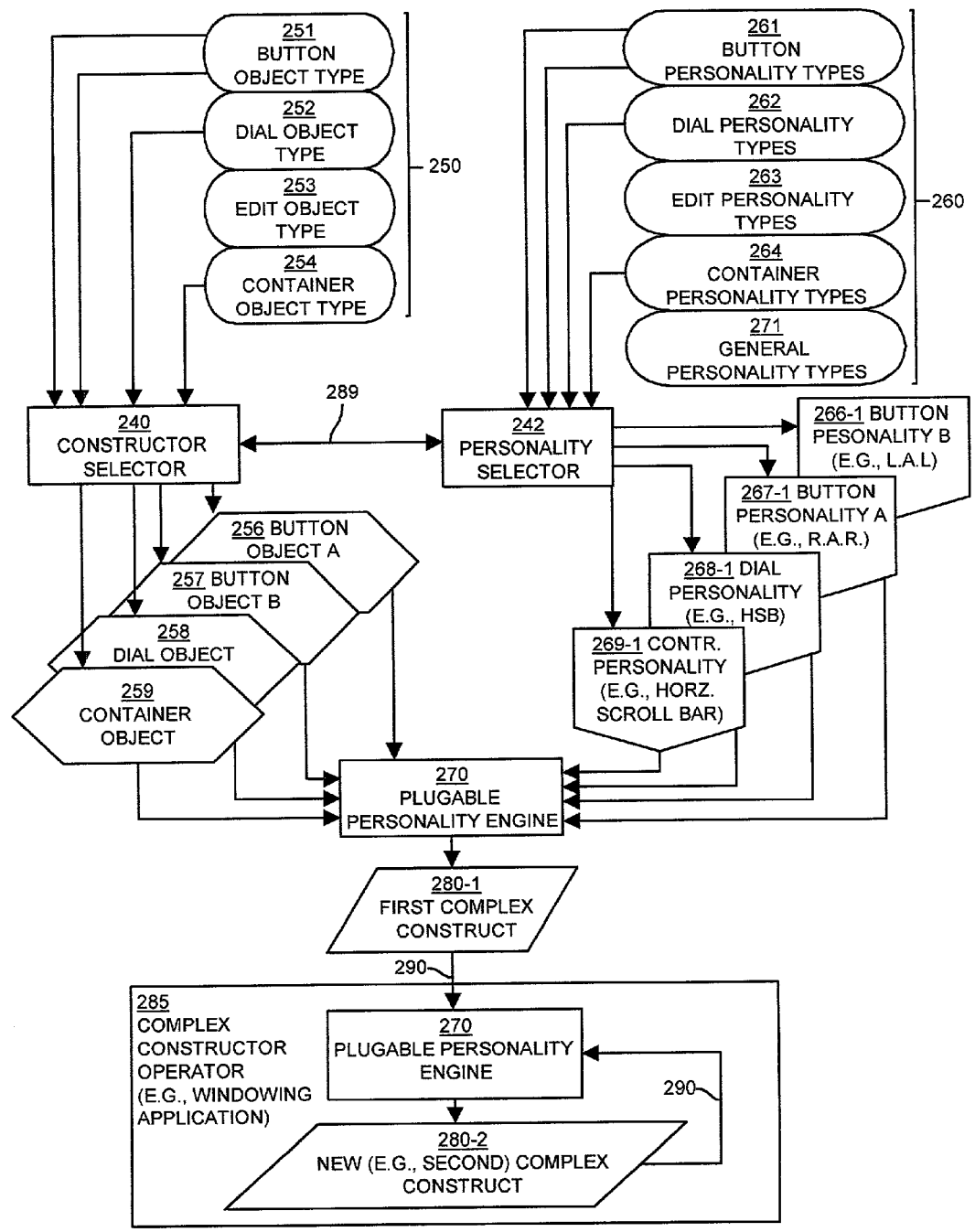
FIG. 3 illustrates an example architecture and data flow diagram showing a process of creating a complex construct in accordance with one embodiment of the invention.

FIG. 3 illustrates an example architecture and data flow diagram of certain embodiments of the invention. Generally, as explained above, the architecture includes four fundamental or basic constructor object types 250 including a button object type 251, a dial object type 252, an edit object type 253 and a container object type 254. Complex objects 280 may be comprised of one or more objects 255 instantiated from these object types 250. It is not required that a complex object 280 include all of these object types 250.

A constructor selector 240 within the constructor process 120-2 (FIG. 1) allows a user to graphically select which basic constructor objects 255 (256 through 259 in this example in FIG. 3) are to be instantiated from the selection of the basic constructor types 250. In the specific example, two button objects 256 and 257 are instantiated as well as a dial object 258 and a container object 259. While not shown in this diagram, the container object 259 includes basic parenting functionality which causes the inheritance, as child objects, of each other instantiated basic constructor objects 256 through 258 to form the complex object 280.

The constructor process 122 also includes a personality selector 242 that allows a user of this embodiment of the invention to select which personalities 260 are to be applied to which of the selected instantiated basic constructor objects 256 through 259. As illustrated, personality types 260 in this embodiment include button personality types 261, dial personality types 262, edit personality types 263, container personality types 264 and general personality types 271. In other words, for the four fundamental classes or types of objects 251 through 254, different personality types 261 through 271 can be assigned to instantiations of those object types as defined by the personalities 260.

Each category of personality types 261 through 271 may contain multiple personality definitions for a class of objects. As previously stated, personality definitions generally define extensions in event functionality and provide layout management which "overrides" any basic constructor characteristic functionality which operates as a default within instantiations of basic constructor objects 255. In other words, the personality types 260 comprise classes which may be attached or otherwise inherited or applied to basic constructor objects 255 to extend basic event management functions, and to provide parenting functionality which is only minimally defined within the four different basic constructor object types 250. Personalities also define how the object is to be rendered (i.e., the look and feel).

The personality selector 242 can receive basic constructor object information 289 which contains, for example, the object identities and number of different basic constructor objects 256 through 259 that a user desires to incorporate into a complex construct 280. Using this information 289, the personality selector 242 can present a proper (e.g., filtered) list of personalities 260 to the user of the constructor process 120-2 for assignment to the selected basic constructor objects 255. Since some personalities may be applicable to some objects but not to others, filtering allows this embodiment to only display applicable personality types 260. In the example of FIG. 3, the user operates the personality selector 242 to select the button personality B 266-1 (a left arrow left side or L.A.L. personality) for assignment to the button object A 256, and selects the button personality A 267-1 (a right arrow right side or R.A.R. personality) for assignment to the button object A 257, and selects a dial personality 268-1, which provides a horizontal scroll bar (HSB) dial personality, for assignment to the dial object 258, and further selects the container personality 269-1 that defines a horizontal scroll bar container personality for assignment to the container object 259.

The constructor process 120-2 includes a plugable personality engine 270 which collectively receives the set of selected basic constructor objects 256 through 259 in conjunction with the selected set of personalities 266-1 through 269-1. Since each personality 266-1 through 269-1 is associated with at least one corresponding basic constructor object 256 through 259. The plugable personality engine 270 then generates a first complex construct 280-1 which comprises embodies the inter-relationships of class definitions defined by the selected personalities and selected basic constructor objects. In many cases, a container object, such as container object 259, serves as a parent object and inherits the container personality 2 69-1. In addition, the container object 259 inherits references to classes which define each of the dial object 258, the button object 257 and the button object 256. Each of those child objects respectively inherits the class definitions associated with its assigned personality. In this manner, the portable personality engine 270 serves as a match maker to produce an appropriate hierarchy of class definitions which define the required information for the first complex construct 280-1.

Once defined, a complex constructor operator 285, such as a window application which embodies the use of the first complex construct 280-1, can simply incorporate a reference to the first complex construct 280-1 class where needed. Accordingly, during operation (e.g., execution or interpretation) of the complex constructor operator 285, which may be a windowing application for example, the complex construct 280-1 is rendered according to its object and personality definitions using the class hierarchy as previously explained. An example of actual sample class definitions written in Java code are provided in various places in the provisional patent application (incorporated by reference above) upon which the present patent application is based. The reader is referred to the details of these sample code portions in the provisional application for specific example of the definitions of basic constructor objects and corresponding personalities.

In addition, according to the previously explained alternative embodiment, the complex constructor operator 285 may detect a requirement for modification to the first complex construct 280-1. In such instances, the modification 290 serves as input into the portable personality engine 272 which is accessible to the complex constructor operator 285. The modification 290 might specify, for example, a change in the appearance or operational functionality of the first complex construct 280-1. The portable personality engine 270 receives the modification 290 and accesses the required personality definitions 266-1 through 269-1 (or accesses a new personality 260, depending upon the modification 290) and produces a new second complex construct 280-2 for use by the complex constructor operator 285.

In this manner, a software application 285 can dynamically modify the appearance or functionality of a complex construct 280-1 created according to embodiments of the invention without requiring the creation of a new widget or class that must be manually written.

Figure 4:
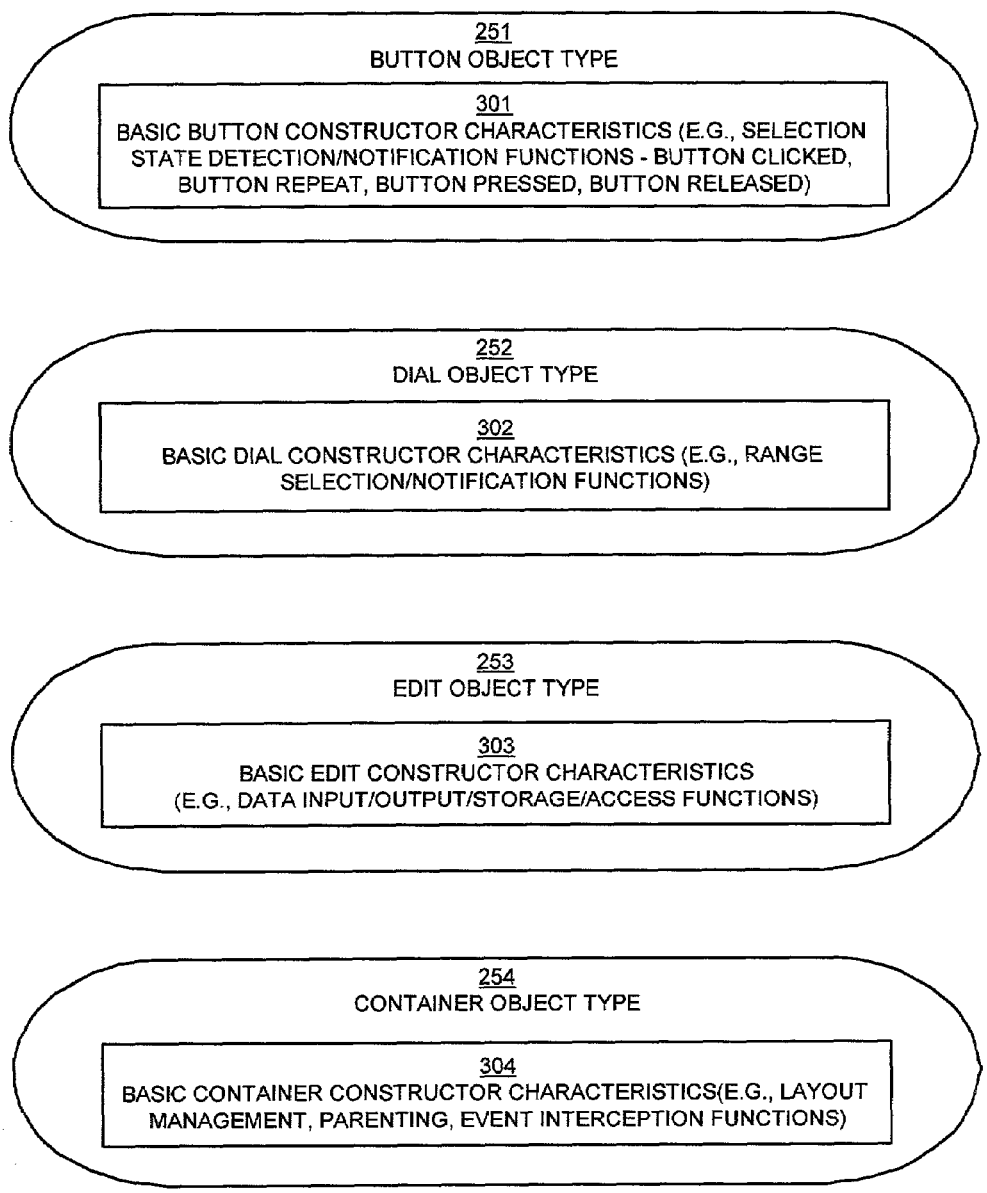
FIG. 4 shows an example of the contents of button, dial, edit and container object types configured in accordance with one embodiment of the invention.

FIG. 4 illustrates an example of the contents of the basic constructor object types 251 through 254, which are implemented as classes according to one embodiment of the invention. As shown, each object type 251 through 254 includes a set of basic constructor characteristic information 301 through 304. Specifically, the button object type 251 includes basic button constructor characteristics 301 which provide basic functions common to all buttons such as selection state detection and notification functions for buttons, functions to determine when a button is clicked, when a button is held or repeated, when a button is pressed, and when a button is released. The dial object type 252 includes basic dial constructor characteristics 302 which provide the fundamental functions related to range selection and notification. The edit object type 253 includes basic edit constructor characteristics 303 that provide fundamental edit functions such as data input, data output, data storage and data access operations. Note the specific types of data that can be edited are not defined, nor is the layout of the edit function defined in this class. The container object type 254 includes basic container constructor characteristics 304 which include layout management functions for objects related to the container class 254, parenting functions and event interception functions. For each of these object types, only the fundamental operations are defined without regard to specific visual representation information and without regard to complex event handling processing which may be required and may vary depending upon the specific scenarios in which objects of these types are used.

Figure 5:
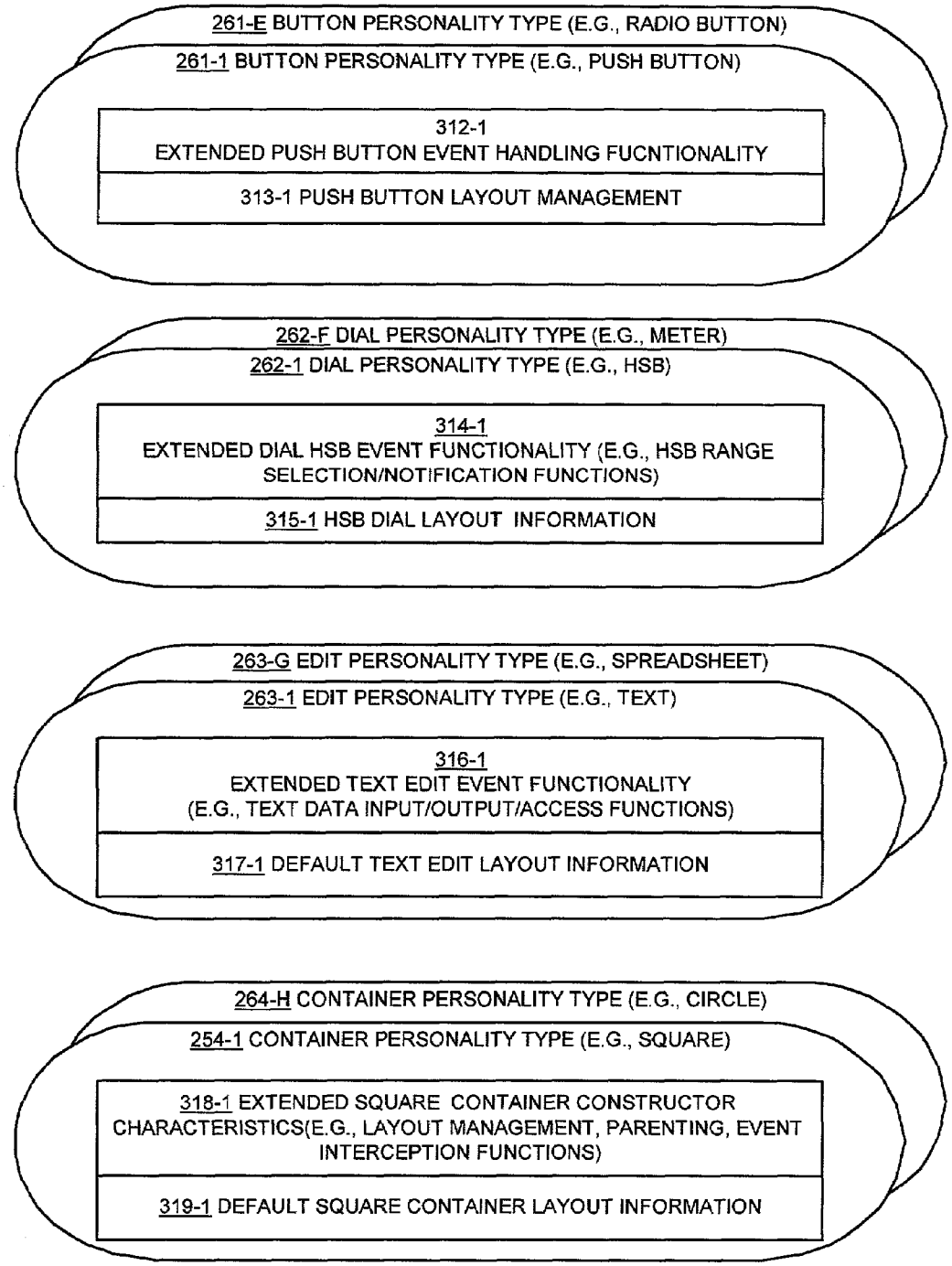
FIG. 5 shows an example of the contents of button, dial, edit and container personality types configured in accordance with one embodiment of the invention.

FIG. 5 illustrates an example of the contents of the four different personality types or classes including button personalities 261, dial personalities 262, edit personalities 263 and container personalities 264.

Specifically, an example button personality type 261-1 is illustrated for a push buttons. The personality type 261-1 includes extended push button event handling functionality 312-1 that defines extended functionality to allow push buttons to obtain proper events in the context of the use of push buttons in a graphical user interface. In addition, the push button personality type 261-1 includes push button layout management functionality 313-1 that contains information regarding how a push button should appear visually (e.g., size and shape) with a graphical user interface environment. Other examples of button personality types which embodiments of the invention can define are push pins, check box buttons, radio buttons, menu items, list items, system default buttons such as min, max, iconify, system-menu, close, open, and the like, arrow buttons, and labels. Each of such personalities (each not shown in the figures) embodies all of the extended functionality, event handling and visual presentation information (code and data required to provides these extensions) that can be applied to an instantiation of a basic button constructor object to make that object look and feel like a button operating according to that personality.

The other personality types (dial, edit and container) illustrated in FIG. 5 contains similar definitions of extended event handling functionality in layout information for each particular example personality type. Note that for each object type 251 through 254 in FIG. 4, there can be multiple corresponding personality types 261 through 264. There may be, for example, edit personality types 263 that include single-line edit, multi-line edit, graphical object edit, text edit, audio edit, video edit, and the like. For dial personalities 262, there may exist scroll bar thumb dial types (both left and right and up and down), slider dial types, knob dial types (ranged or infinite), sliding scale dials, meters, thumb wheels, and the like.

In this manner, embodiments of the invention may apply, for example, any one of the multiple dial personality types 262-1 through 262-F to a single dial object instantiated based upon a dial object type 252 in order to transform the look and feel and overall operation of the dial object into different formats as required in different circumstances. By selecting different personality types at different times, the visual representation and functional operation of the dial object can change in a dynamic manner.

Figure 6:
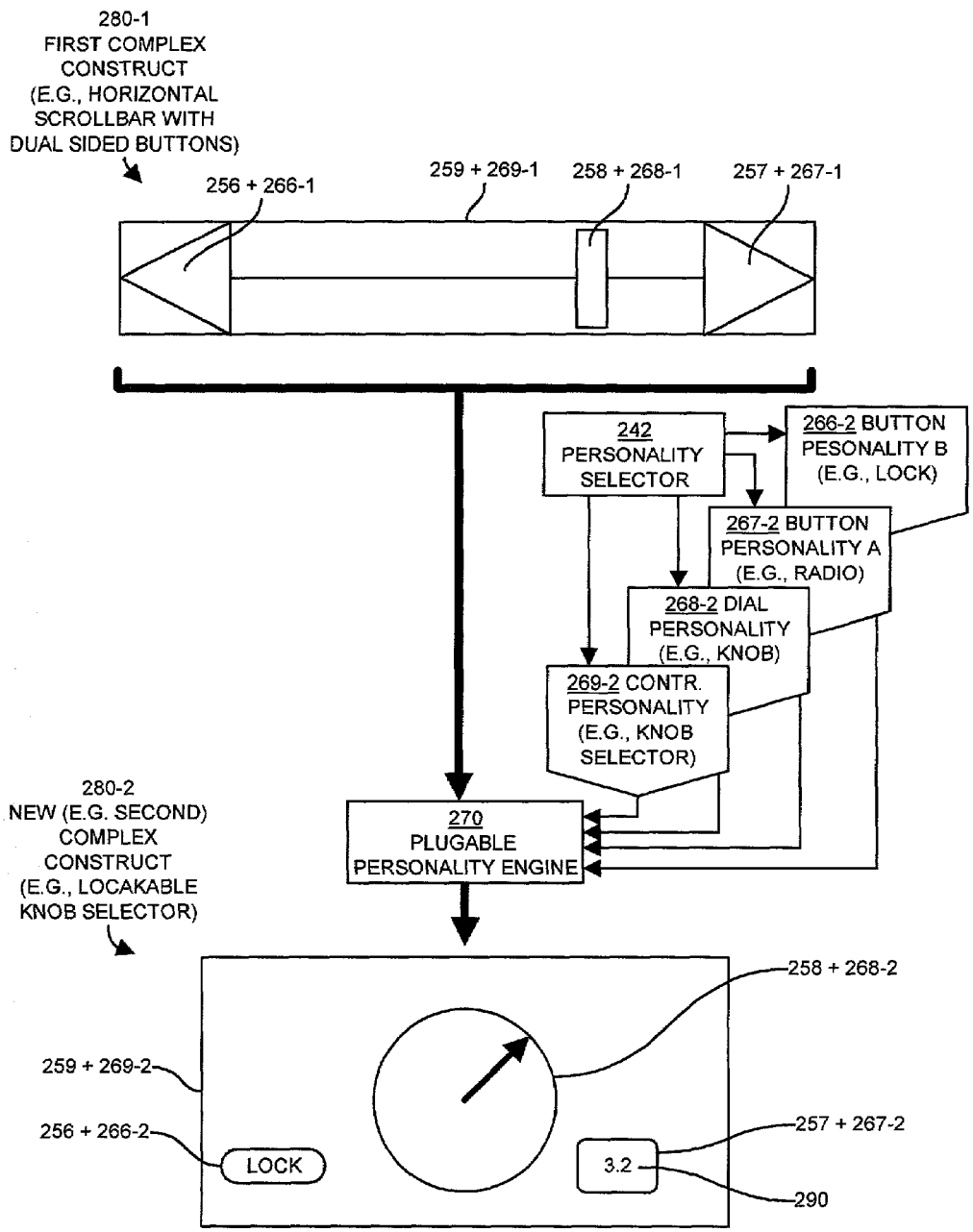
FIG. 6 illustrates an example of the operation of an embodiment of the invention in which a scrollbar complex construct composed of object types and personality types and is transformed into a knob-type complex construct via personality modifications.
Figure 7:
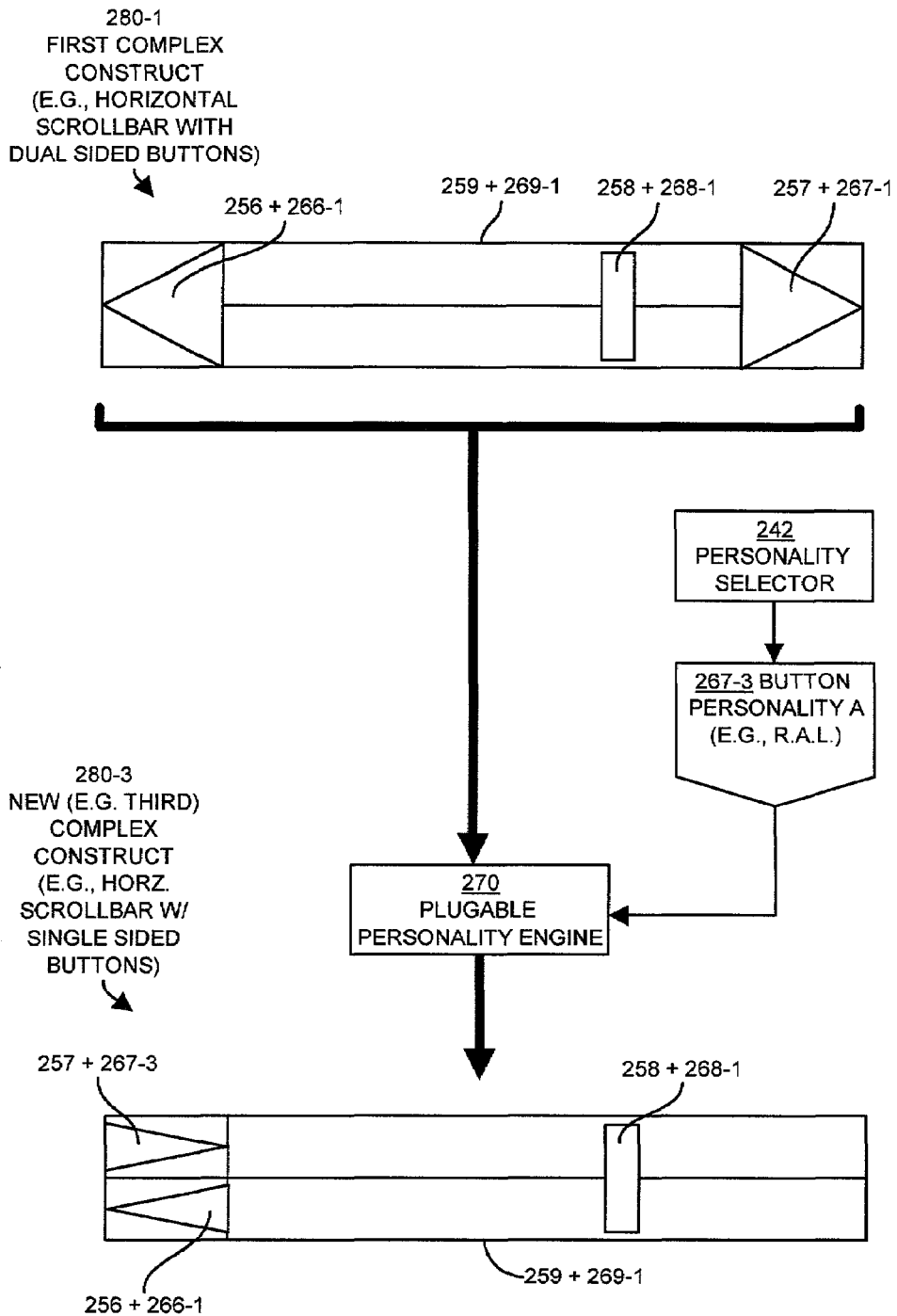
FIG. 7 illustrates another example of the operation of an embodiment of the invention in which a scrollbar complex construct is transformed into a second type of scrollbar complex construct via a modification of a personality.

FIGS. 6 and 7 illustrate this concept and convey many of the advantages provided by embodiments of the invention. Specifically, with respect to FIG. 6, the first complex construct 280-1 in the form of a horizontal scroll bar with dual sided arrow shaped buttons is created by embodiments of the invention as previously explained. As shown in this illustration, the left-handed arrow button in the scroll bar complex construct 280-1 is created as a result of the combination of a button object 256 to which a left-arrow-left button personality 266-1 has been applied. Likewise, the other basic constructor objects 257 through 259 collectively combined to form the scroll bar complex construct 280-1 by application or assignment of specific respective personalities 267-1 through 269-1.

Directing attention now to the portable personality engine 270 illustrated in FIG. 6, the portable personality engine 270 can receive various other personality modifications 266-2 through 269-2 (collectively shown as 290 in FIG. 4) as a result, in this example, of a user operating the personality selector 242 within the constructor process 120-2 to provide the personality modifications. As a result, the plugable personality engine 270 produces a new or second complex construct identified here as a "lockable knob selector" 280-2.

The lockable knob selector complex construct 280-2 includes the same instantiations of the basic constructor objects 256 to 259. However, to create the lockable knob selector complex construct 280-2, the plugable personality engine 270 applies the new set of respective personalities 266-2 through 269-2 such that the left pointing arrow of the scroll bar complex construct 280-1 becomes a locking button using the application of the button personality type 266-2. Additionally, the dial basic constructor object 258 is altered from a slider dial as shown in the first complex construct 280-1 to a knob shaped dial by application of the knob dial personality 268-2. Further still, the right facing arrow button in the first scroll bar complex construct 280-1 is altered into a radio button within the second complex construct 280-2 by application of the radio button personality 267-2 to the basic button constructor object 257. The radio button (i.e., the combination of the basic radio constructor object 257 and the applied radio button personality 267-2) allows the output of a the dial value ("3.2" in this example) that indicates the position of the knob selector shown by the combination of the basic dial constructor object 258 and the application of the knob dial personality 268-2.

Is to be understood that the operation of the lockable knob selector complex construct 280-2 is fundamentally or "underlyinglly" quite similar to the scroll bar complex construct 280-1 and produces the same output to the application (e.g., 285) to incorporate this complex construct

280-2. In operation, a user can select the knob selector in the middle of the lockable knob complex construct 280-2 via movements of a mouse, for example, to rotate the knob left or right which causes the arrow on the knob to be repositioned to a new value. The actual value of a new setting is dynamically displayed at location 290 within the radio button. In this manner, a user can manipulate the knob to different settings and can be visually presented with a value of the new settings just as the scroll bar complex construct 280-1 presents a scroll position within data using the left or right location of the dial object as relatively positioned between the two arrow buttons on the horizontal scroll bar.

According to a further operation of the lockable knob selector complex construct 280-2, the user may select the lock button in this construct in order to prevent accidental rotation of the selector knob. Accordingly, this new complex construct 280-2 offers much of the same fundamental underlying functionality as does a regular horizontal scroll bar, but does so using less screen real estate and does so in a manner that is somewhat more reliable due to the locking function and due to the visual representation of the numeric data indicating a precise position within the data.

This new complex construct 280-2 can be quite beneficial in graphical user interface environments which are prone to accidental and unintentional selection of a new value as might be the case when using a horizontal scroll bar. For example, the horizontal scroll bar might be quite appropriate in desktop computer applications. However, for a handheld computing device, the second complex construct 180-2 using the lockable knob selector might be more appropriate in order to avoid accidental touching of the knob when using an input device such as a touch pad pen. Since the knob can be locked in position to prevent accidental alteration, this new construct 180-2 provides equivalent functionality to a horizontal scroll bar, but does so with increased functionality for the handheld context in which it is explained for this example.

It should now be apparent to those skilled in the art that the functionality of embodiments of the invention can transform complex constructs from a first form to a second form with minimal requirements for code revisions and without the requirements of defining an entirely new complex construct from scratch.

FIG. 7 illustrates another example of a modification of a first complex construct 280-1 in the form of a horizontal scroll bar to a third complex construct 280-3 which is also a horizontal scroll bar but that contains single sided buttons. To achieve the third complex construct 280-3 as shown in FIG. 7, embodiments of the invention only need to be presented with the personality modification that alters the button personality assigned to the basic button constructor object 257 (i.e., the original button personality 267-1) to a new button personality 267-3 that causes relocation of the right hand scroll bar button to the left side of the scroll bar in the third complex construct 280-3. This simple modification results in a scroll bar which is more efficient to use from a user perspective since the user of the scroll bar shown by the third complex construct 280-3 does not need to move a mouse pointer back and forth between the right in left side of the scroll bar in order to accomplish scrolling operations in both directions within data. Accordingly, a simple modification to the personality of a first complex construct can result in the creation of simpler to use and more efficient complex construct as a result of the functionality of embodiments of the invention.

Those skilled in the art will understand that there can be many variations made to the embodiment explained above while still achieving the same objective of those embodiments and the invention in general. Such variations are intended to be covered by the scope of this invention. As such, the foregoing description of embodiments of the invention are not intended to be limiting. Rather, any limitations to the invention are presented in the following claims.

What is claimed is:

1. A method for composing a complex construct for use on a graphical display of a computerized device, the method comprising the steps of:
    receiving a selection of basic constructor objects for use in the complex object, the selection of basic constructor objects chosen from a set of basic constructor object types including a button object type, a dial object type, an edit object type, and a container object type, each of the basic constructor object types defining respective basic constructor functional characteristics;
    receiving a selection of at least one personality to assign to at least one of the basic constructor objects chosen from the selection of basic constructor object types, the selection of at least one personality chosen from a set of personality types that define functional and graphical layout extensions to basic constructor characteristics associated with the basic constructor object types;
    receiving a selection of specific event handling functionality that is to be enabled for that personality in relation to a basic constructor object to which that personality is assigned;
    receiving a selection of a specific view which that personality provides to that basic constructor object when rendered on the graphical display of the computerized device;
    combining the selection of basic constructor objects with the selection of at least one personality to form a first complex construct; and
    operating the first complex construct on the graphical display according to a first operation state defined by the basic constructor functional characteristics associated with the basic constructor objects in the first complex construct and by the functional and graphical layout extensions to the basic constructor characteristics defined by the selected at least one personality assigned to the basic constructor objects in the complex construct.

2. The method of claim 1 further comprising the steps of:
    receiving a modification to the selection of a personality assigned to at least one of the basic constructor objects in the first complex construct; and
    in response to receiving the modification, transforming the first complex construct having the first operational state to a second complex construct having a second operational state.

3. The method of claim 2 further comprising the steps of:
    operating the first complex construct to receive input indicating that the first complex object is to transform itself into a second complex construct by substituting a view, defined by the at least one personality assigned to at least one of the basic constructor objects in the first complex construct, with a new view defined by the modification received to the selection of one of the at least one personality.

4. The method of claim 1 wherein each basic constructor object is an instantiation of a basic constructor class that defines the basic constructor characteristics which provide specific functionality including an event handling framework dedicated to supplying methods and event handling processing associated with that basic constructor class.

5. The method of claim 4 wherein:
the button object, when included in the complex construct, provides specific functionality to the complex construct to provide notification of a change to a selection state maintained by the button object upon receiving input;
the dial object, when included in the complex construct, provides specific functionality to the complex construct to provide a selection of a value from a range of possible values;
the edit object, when included in the complex construct, provides specific functionality to the complex construct to receive data for editing, to store the data and to provide access to the data; and
the container object, when included in the complex construct, provides at least one of a parenting functionality, a layout management functionality and an event interception functionality to the complex construct comprised of a combination of the basic constructor objects.

6. The method of claim 4 wherein each basic constructor object has an associated set of applicable personalities, each applicable personality defining an extended set of event listeners that are specific to the basic constructor objects to which those personalities are applicable, and which extend the event management functionality provided by the basic constructor characteristics of the basic constructor type from which that basic constructor object is instantiated.

7. The method of claim 6 wherein each applicable personality for a basic constructor object further defines a stock view for the basic constructor object when rendered on the graphical display of the computerized device.

8. The method of claim 1 wherein the complex construct is a scroll bar including two basic button constructor objects combine with respective scroll bar button personalities, a basic dial constructor object combined with a respective scroll bar dial personality, and a basic container constructor object combined with a respective scroll bar container personality.

9. The method of claim 1 further comprising:
combining, in the resultant complex construct, the selected basic constructor object and corresponding applicable personalities as a unified component operable for deployment in an executable software application.

10. The method of claim 9 wherein each basic constructor object has an associated set of applicable personalities, each applicable personality defining an extended set of event listeners that are specific to the basic constructor objects to which those personalities are applicable, and which extend the event management functionality provided by the basic constructor characteristics of the basic constructor type from which that basic constructor object is instantiated.

11. The method of claim 1 further comprising the steps of:
receiving, from an executing software application in which the first complex construct is embedded, a modification to the selection of a personality assigned to at least one of the basic constructor objects in the first complex construct; and
in response to receiving the modification, transforming the first complex construct having the first operational state to a second complex construct having a second operational state.

12. The method of claim 4 wherein each basic constructor object has an associated set of applicable personalities, each applicable personality defining an extended set of event listeners that are specific to the basic constructor objects to which those personalities are applicable, and which extend the event management functionality provided by the basic constructor characteristics of the basic constructor type from which that basic constructor object is instantiated, the resulting complex construct operable to exhibit operation defined by the personality and set of event listeners in a software application.

13. A computerized device comprising:
an IO interface;
a display;
a memory system;
a processor;
an interconnection mechanism coupling the IO interface, the display, the memory system and the processor;
wherein the memory system is encoded with a constructor application that when performed on the processor, produces a constructor process that causes the computer system to compose a complex construct for use on the display of the computerized device by performing the operations of:
receiving, via the IO interface, a selection of basic constructor objects for use in the complex object, the selection of basic constructor objects chosen from a set of basic constructor object types including a button object type, a dial object type, an edit object type, and a container object type, each of the basic constructor object types defining respective basic constructor functional characteristics;
receiving, via the IO interface, a selection of at least one personality to assign to at least one of the basic constructor objects chosen from the selection of basic constructor object types, the selection of at least one personality chosen from a set of personality types that define functional and graphical layout extensions to the basic constructor characteristics associated with the basic constructor object types;
receiving a selection of specific event handling functionality that is to be enabled for that personality in relation to a basic constructor object to which that personality is assigned;
receiving a selection of a specific view which that personality provides to that basic constructor object when rendered on the graphical display of the computerized device;
combining, in the memory system, the selection of basic constructor objects with the selection of at least one personality to form a first complex construct; and
operating the first complex construct on the display according to a first operation state defined by the basic constructor functional characteristics associated with the basic constructor objects in the first complex construct and by functional and graphical layout characteristics defined by the selected at least one personality assigned to the basic constructor objects in the complex construct.

14. The computerized device of claim 13 wherein the constructor process further performs the operations of:
receiving, via the IO interface, a modification to the selection of a personality assigned to at least one of the basic constructor objects in the first complex construct; and
in response to receiving the modification, transforming the first complex construct having the first operational state to a second complex construct having a second operational state.

15. The computerized device of claim 14 wherein the constructor process further performs the operations of:
operating the first complex construct to receive input indicating that the first complex object is to transform itself into a second complex construct by substituting a view, defined by the at least one personality assigned to at least one of the basic constructor objects in the first complex construct, with a new view defined by the modification received to the selection of one of the at least one personality.

16. The computerized device of claim 13 wherein each basic constructor object is an instantiation in the memory system of a basic constructor class that defines the basic constructor characteristics which provide specific functionality including an event handling framework dedicated to supplying methods and event handling processing associated with that basic constructor class.

17. The computerized device of claim 16 wherein:
the button object, when included in the complex construct, provides specific functionality to the complex construct to provide notification of a change to a selection state maintained by the button object upon receiving input;
the dial object, when included in the complex construct, provides specific functionality to the complex construct to provide a selection of a value from a range of possible values;
the edit object, when included in the complex construct, provides specific functionality to the complex construct to receive data for editing, to store the data and to provide access to the data; and
the container object, when included in the complex construct, provides at least one of a parenting functionality, a layout management functionality and an event interception functionality to the complex construct comprised of a combination of the basic constructor objects.

18. The computerized device of claim 16 wherein each basic constructor object has an associated set of applicable personalities, each applicable personality defining an extended set of event listeners that are specific to the basic constructor objects to which those personalities are applicable, and which extend the event management functionality provided by the basic constructor characteristics of the basic constructor class from which that basic constructor object is instantiated.

19. The computerized device of claim 18 wherein each applicable personality for a basic constructor object further defines a stock view for the basic object constructor when rendered on the graphical display of the computerized device.

20. The method of claim 13 wherein the complex construct is a scroll bar displayed on the display and includes two basic button constructor objects combined with respective scroll bar button personalities, a basic dial constructor object combined with a respective scroll bar dial personality, and a basic container constructor object combined with a respective scroll bar container personality.

21. The computerized device of claim 13 further comprising a constructor process operable to form the resultant complex construct by combining a plurality of basic constructor objects, the complex construct and corresponding applicable personalities as a unified component operable for deployment in an executable software application.

22. The computerized device of claim 21 wherein each basic constructor object has an associated set of applicable personalities, each applicable personality defining an extended set of event listeners that are specific to the basic constructor objects to which those personalities are applicable, and which extend the event management functionality provided by the basic constructor characteristics of the basic constructor class from which that basic constructor object is instantiated.

23. The computerized device of claim 16, wherein the instantiation in the memory system, when executed, exhibits a behavior according to the selected personalities in the first complex construct, wherein the resulting instantiation is operable for execution on the computerized device, the instantiation operable in conjunction with a software application for executing the behavior defined by the personalities, the behavior further including performing a state change responsive to the event listeners based on user input received in conjunction with the software application for performing the supplied methods and event handling processing.

24. A computer program product having a computer-readable medium including computer program logic encoded thereon that, when executed on a computer system having a coupling of a memory system, a processor, an IO interface and a display provides a method for composing complex construct for use on the display of the computerized system by performing the operations of:
receiving, via the IO interface, a selection of basic constructor objects for use in the complex object, the selection of basic constructor objects chosen from a set of basic constructor object types including a button object type, a dial object type, an edit object type, and a container object type, each of the basic constructor object types defining respective basic constructor functional characteristics;
identifying a set of operational states corresponding to each of the basic constructor objects, the identified operational states responsive to IO activity responsive to user actions;
receiving, via the IO interface, a selection of at least one personality to assign to at least one of the basic constructor objects chosen from the selection of basic constructor object types, the selection of at least one personality chosen from a set of personality types that define functional and graphical layout extensions to basic constructor characteristics associated with the basic constructor object types, the personality indicative of the operational state defined by each of the basic constructor objects;
receiving a selection of specific event handling functionality that is to be enabled for that personality in relation to the basic constructor object to which that personality is assigned;
receiving a selection of a specific view which that personality provides to that basic constructor object when rendered on the graphical display of the computerized device;
combining, in the memory system, the selection of basic constructor objects with the selection of at least one personality to form a first complex construct; and
operating the first complex construct on the display according to a first operation state defined by the basic constructor functional characteristics associated with the basic constructor objects in the first complex construct and by the functional and graphical layout characteristics defined by the at least one selected personality assigned to the basic constructor objects in the complex construct.

25. A computerized device comprising:
an IO interface;
a display;
a memory system;
a processor;
an interconnection mechanism coupling the IO interface, the display, the memory system and the processor;
wherein the memory system is encoded with a constructor application that when performed on the processor, produces a constructor process that provide a means for composing a complex construct for use on the display of the computerized device and which includes:
means for receiving, via the IO interface, a selection of basic constructor objects for use in the complex object, the selection of basic constructor objects chosen from a set of basic constructor object types including a button object type, a dial object type, an edit object type, and a container object type, each of the basic constructor object types defining respective basic constructor functional characteristics;
means for receiving, via the IO interface, a selection of at least one personality to assign to at least one of the basic constructor objects chosen from the selection of basic constructor object types, the selection of at least one personality chosen from a set of personality types that define functional and graphical layout extensions to basic constructor characteristics associated with basic constructor object types, the personality indicative of the operational state defined by each of the basic constructor objects;
means for receiving a selection of specific event handling functionality that is to be enabled for that personality in relation to a basic constructor object to which that personality is assigned;
means for receiving a selection of a specific view which that personality provides to that basic constructor object when rendered on the graphical display of the computerized device means for combining, in the memory system, the selection of basic constructor objects with the selection of at least one personality to form a first complex construct; and
means for operating the first complex construct on the display according to a first operation state defined by the basic constructor functional characteristics associated with the basic constructor objects in the first complex construct and by functional and graphical layout characteristics defined by the at least one selected personality assigned to the basic constructor objects in the complex construct.

26. A method for transforming complex constructs for use in a graphical interface environment, the method comprising the steps of:
identifying a set of operational states corresponding to basic constructor objects in the graphical user interface environment, the identified operational states responsive to IO activity responsive to user actions;
defining a first complex construct to include at least one of:
  a basic dial constructor object;
  a basic edit constructor object;
  a basic button constructor object; and
  a basic container constructor object;
in combination with at least one personality, the personality indicative of the operational state defined by each of the basic constructor objects, each of the basic constructor objects defining respective basic constructor functional characteristics, each of the at least one personality defining functional and graphical layout extensions to the basic constructor characteristics of a respective one of the basic constructor objects;
receiving a selection of specific event handling functionality that is to be enabled for the at least one personality in relation to a basic constructor object to which that personality is assigned;
receiving a selection of a specific view which the selected personalities provide to that basic constructor object when rendered on the graphical display of the computerized device;
receiving a modification to the at least one personality; and
transforming the first complex construct to a second complex construct according to the modification to the at least one personality.

27. The method of claim 26 wherein the step of receiving a modification to the at least one personality receives the modification in real time from an application that includes the first complex construct such that the first complex construct is transformed by the step of transforming in real-time to produce the second complex construct.

28. A method for composing a complex construct for use on a graphical display of a computerized device, the method comprising the steps of:
receiving a selection of basic constructor objects for use in the complex object, the selection of basic constructor objects chosen from a set of basic constructor object types including a button object type, a dial object type, an edit object type, and a container object type, each of the basic constructor object types defining respective basic constructor functional characteristics;
identifying a set of operational states corresponding to the basic constructor objects in the graphical user interface environment, the identified operational states responsive to IO activity responsive to user actions;
receiving a selection of at least one personality to assign to at least one of the basic constructor objects chosen from the selection of basic constructor object types, the selection of at least one personality chosen from a set of personality types that define functional and graphical layout extensions to basic constructor characteristics associated with the basic constructor object types, the personality indicative of the operational state defined by each of the basic constructor objects;
receiving a selection of specific event handling functionality that is to be enabled for that personality in relation to a basic constructor object to which that personality is assigned;
receiving a selection of a specific view which that personality provides to that basic constructor object when rendered on the graphical display of the computerized device;
combining the selection of basic constructor objects with the selection of at least one personality to form a first complex construct defined by a unified combination of the selected basic constructor objects and the corresponding selected personalities; and
operating the first complex construct on the graphical display according to a first operation state defined by the basic constructor functional characteristics associated with the basic constructor objects in the first complex construct and by the functional and graphical layout extensions to the basic constructor characteristics defined by the selected at least one personality assigned to the basic constructor objects in the complex construct;

wherein:
(1) the button object, when included in the complex construct, provides specific functionality to the complex construct to provide notification of a change to a selection state maintained by the button object upon receiving input;
(2) the dial object, when included in the complex construct, provides specific functionality to the complex construct to provide a selection of a value from a range of possible values;
(3) the edit object, when included in the complex construct, provides specific functionality to the complex construct to receive data for editing, to store the data and to provide access to the data; and
(4) the container object, when included in the complex construct, provides at least one of a parenting functionality, a layout management functionality and an event interception functionality to the complex construct comprised of a combination of the basic constructor objects.

29. The method of claim 28 wherein the combination of the basic constructor object with the selected personality defines an extended set of event listeners that are specific to the basic constructor objects to which those personalities are applicable, and which extend the event management functionality provided by the basic constructor characteristics of the basic constructor type from which that basic constructor object is instantiated, the resulting complex construct operable to exhibit operation defined by the personality and set of event listeners in a software application.

* * * * *